UNITED STATES PATENT OFFICE.

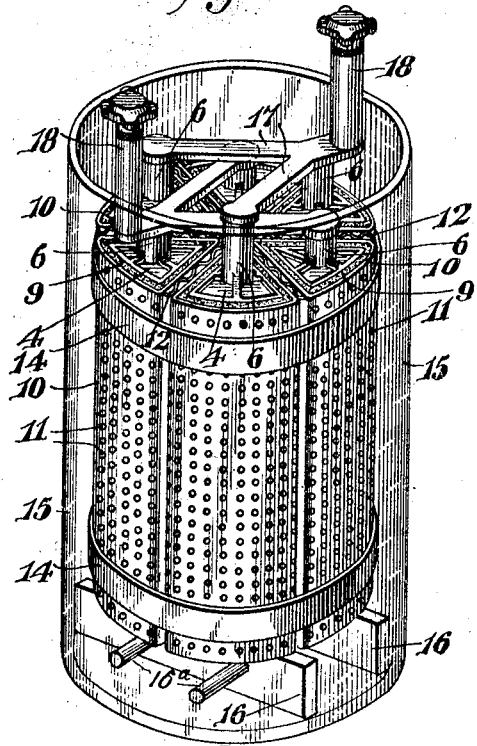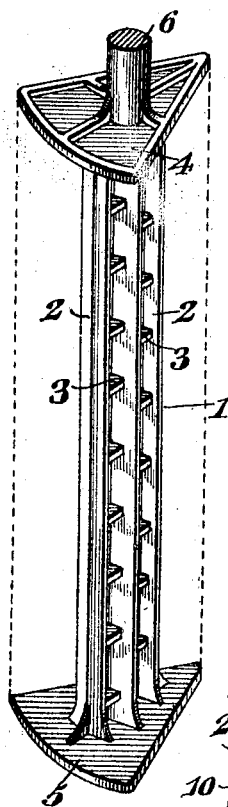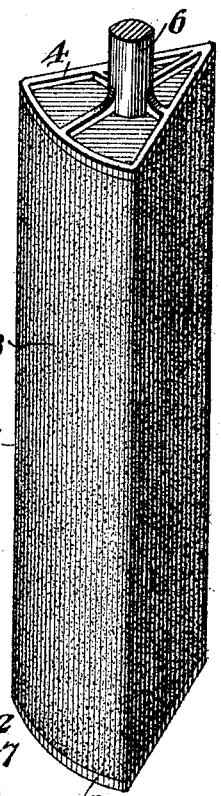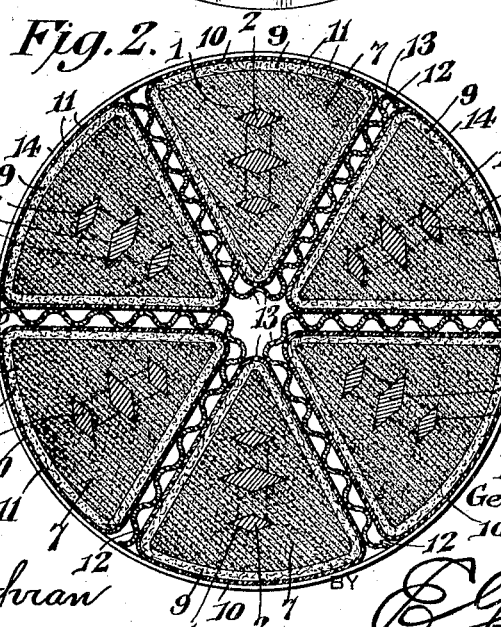

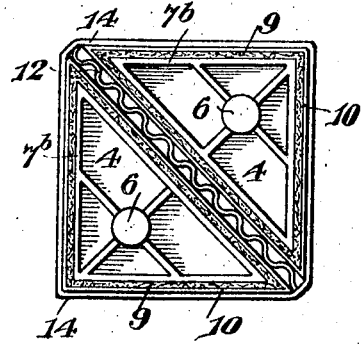
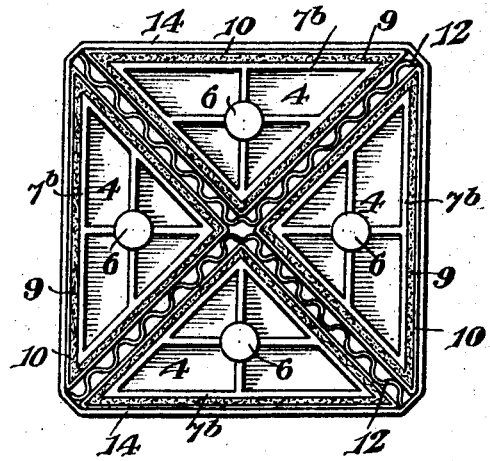
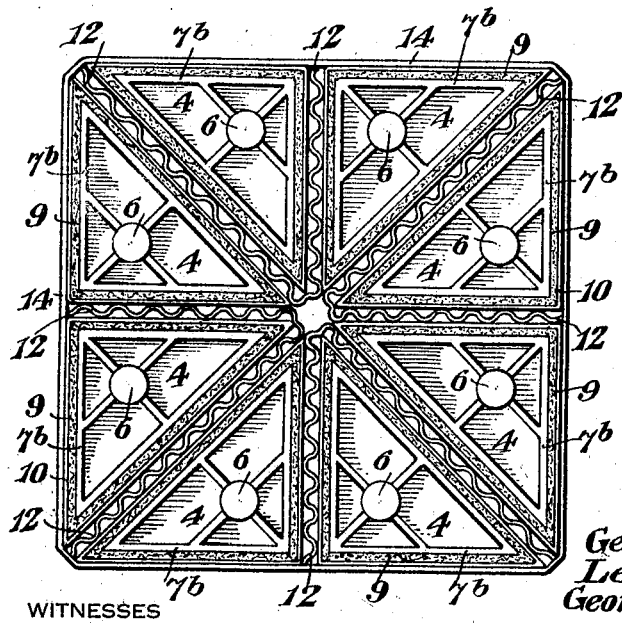
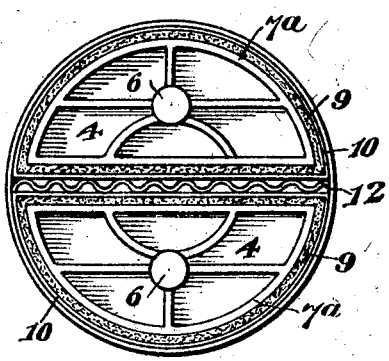

GEORGE FULLER, LEONARD FULLER, AND GEORGE JOHN ANDREW FULLER, OF BOW, LONDON, ENGLAND.

SECONDARY OR STORAGE BATTERY.

1,092,253.  Specification of Letters Patent.  Patented Apr. 7, 1914.

Application filed September 4, 1913. Serial No. 788,129.

*To all whom it may concern:*

Be it known that we, GEORGE FULLER, LEONARD FULLER, and GEORGE J. A. FULLER, subjects of the King of Great Britain, residing at Bow, London, England, have invented a new and useful Secondary or Storage Battery, of which the following is a specification.

This invention has reference to improvements in secondary or storage batteries, and is designed to provide a storage battery or lead accumulator which shall be free from certain inherent weaknesses of the plate type of lead accumulators.

That there are certain serious defects in the plate type of accumulator has long been recognized. The most efficient plate accumulator is that which contains the least amount of metal in its structure, and the greatest amount of active material, but on attempting to increase the efficiency at the expense of structure there inevitably results a buckling of the plates when the accumulator is subjected to the least overstrain. Unless the greatest care is exercised the plates are distorted and the active material is dislodged and usually there is found a pile of mud in the bottom of all plate cells after any considerable service. Unless the greatest care is exercised and effective means are employed to prevent a plate battery from discharging below its safe discharge electromotive force, sulfating invariably follows, and if a plate battery is ever neglected when standing in the discharge condition, there is complete sulfating of the plates, and consequent rapid deterioration of the battery. Again, continual charging and discharging tends to disintegrate the active material in the plate type of accumulator, and after a period of hard work the loss of efficiency from this cause alone is a serious consideration.

The present invention while employing substantially the same materials as the plate type of accumulator differs therefrom in having the electrodes in the form of blocks of taper form in cross section, so that each block is a geometrical solid of such conformation that two or more may be assembled, with insulation between their adjacent faces, into larger substantially regular geometric solids. This is best brought about by having the blocks in the form of triangular solids or sectors of cylinders, whereby two or more blocks may be assembled into groups of square or other rectangular cross section, or of circular cross section. In either instance the blocks are thick in one direction and taper oppositely therefrom to relatively thin edges, this permitting the employment of a metallic core surrounded by a relatively thick mass of active material and permits the formation of a cell in a manner wholly resistant to forces which usually are destructive to the ordinary plate type of accumulator electrode or element.

The invention will be best understood from a consideration of the following detail description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a perspective view of an accumulator cell of cylindrical type embodying the present invention. Fig. 2 is a cross section of the assembled electrodes shown in Fig. 1, but drawn on a larger scale. Fig. 3 is a perspective view of the metallic core of a segmental block electrode. Fig. 4 is a perspective view of a complete electrode of the segmental type with the insulating envelop omitted. Fig. 5 is a plan view of assembled accumulator electrodes where each electrode is of the triangular type. Fig. 6 is a similar view showing the arrangement where a greater number of triangular electrodes are employed. Fig. 7 is a plan view of a still larger group of triangular electrodes. Fig. 8 is a plan view of a pair of substantially semicylindrical electrodes.

In constructing accumulators in accordance with the present invention there is provided a skeleton core 1 of lead, and usually of antimonial lead, and this core is made either of a number of longitudinal members 2 with spaced connecting cross pieces 3, which may be all cast together, or it may be made in any suitably manner. At each end of the core are heads 4, 5, respectively, conforming in shape to the cross sectional shape of the finished electrode, and the head 4 has a terminal 6 projecting therefrom. As will be understood, the entire core including the heads and terminal may be cast in one piece from lead, especially antimonial lead, since such type of lead is not materially affected by the charging and discharging of the cell.

In various forms of electrodes which may be produced under the present invention, the core 1 may be quite similar to that shown in Fig. 3, while the heads 4 and 5 will conform to the cross sectional shape of the complete electrode. In the showing of Figs. 1 to 4 the electrodes, designated generally by the reference numeral 7, are shown as sectors of a cylinder where each sector includes about sixty degrees, while in Fig. 8 the electrodes, indicated generally at 7ª, include nearly one hundred and eighty degrees, and in Figs. 5 to 7 the electrodes 7ᵇ are triangular.

Each electrode is formed by molding or otherwise producing about the core 1 between the heads 4 and 5 a mass 8 of active material, such as usually employed in lead accumulators, so that there is produced an electrode which may be termed a block electrode, as distinguished from a plate electrode where the thickness is usually but a small fraction of the width of the plate, while in the block electrode the greatest thickness may be more than half the width of the block, and, moreover, the block tapers from its point of greatest thickness toward one face. Each block between the heads 4 and 5 is inclosed by a layer 9 of suitable material of an insulating character and resistant to the acid electrolyte employed. Such a layer may be composed of the material known as woven glass or glass wool which possesses both insulating and acid-proof qualities, and, moreover, is sufficiently porous to permit free access of the electrolyte to the surface of the block electrode. The layer 9 has comparatively little inherent strength, and so it is inclosed by an envelop 10 of a material possessing the requisite strength and also having insulating qualities. Such material is found in celluloid, but celluloid is quite impervious to the electrolyte so the celluloid layer 10 has many perforations 11 formed in it, wherefore the electrolyte will pass freely through the celluloid layer and from thence it has free access through the layer 9 to the active material of the electrode. When the electrodes are assembled such perforated envelops 10 if brought into contact would be liable to cover up the perforations 11 because of the difficulty of making them match, and in order to prevent this there is introduced between the adjacent surfaces of the envelops separators 12 which may be also of insulating material, and for this purpose corrugated celluloid may be employed, and these celluloid separators are provided with many perforations 13. Finally, the assembled electrodes are bound tightly together with the insulating wrappings and separators by bands 14 which may likewise be formed of celluloid.

It is not necessary that celluloid be employed, for there are other materials having like qualities, among which ebonite may be named, so while celluloid may have certain advantages over other materials in the matter of cost and in some other features, the invention is not by any means limited to the use of celluloid for wrapping, separating and insulating the electrodes, nor is it necessary that glass wool be used in the layer 9, since there are other inert, porous, insulating and preferably fibrous materials which may be employed for a like purpose, and among such materials asbestos may be named.

It is customary, of course, to inclose the assembled electrodes in a container, one form of which is indicated at 15 in Fig. 1, and such container may be made of glass or any suitable material customarily employed in accumulator practice. The cell shown in Fig. 1 includes supports 16 upon which the assembled electrodes are mounted, thus lifting them above the bottom of the container 15, and these supports are shown provided with transversely arranged spacer rods 16ª thus positioning the supports with reference to the container 15. The terminals or lugs 6 of like electrodes are connected together by metal bars 17 and each group is provided with the usual terminal binding post 18.

The simpler the form of the blocks the stronger and more efficient is the completed cell, and by varying the angle of the blocks the exposed surface of the electrodes is proportioned to suit the various uses to which the battery may be put, and in any instance the variation of area is obtained by building up the cell of comparatively small unit blocks, whereby there is produced a cell of great mechanical strength and electric efficiency.

The present invention has certain marked advantages over accumulators or secondary batteries in which the electrodes are made up of plates, in several particulars. Electrodes of block form may be fitted together to provide a markedly strong mechanical structure which is also very compact whether the accumulator as a whole be circular or of square or other rectangular form. Moreover, the block form of electrodes permits generally the drawing off of current at a higher rate per square inch of surface than can safely be done with the plate form of electrode because of the larger amount of active material available in the block form of electrode. Again, the active material is pressed about a central core or grid of lead so deeply buried in the mass that it cannot be freely acted upon by the electrolyte and consequently does not undergo any appreciable change, which accounts for the absence of any tendency to grow.

Short circuiting, whether accidental or otherwise, is not harmful, since the rate of discharge on short circuit is limited in accordance with the internal resistance of the cell determined by the number and thickness of the blocks, and the great mechanical strength of the cell permits prolonged short circuits without disintegration and it is even possible to reverse the battery without injury. The great amount of active material present makes it possible to leave the cell standing for from nine to twelve months without material loss of the charge or danger of sulfate forming. For all practical purposes an accumulator is discharged when the voltage drops below 1.8, but with the present invention there is so large a reserve of latent energy still in the electrodes that even should the discharge be continued as low as 1.5 volts this latent energy, on the cessation of the discharge, immediately sends the voltage up to normal where it remains almost indefinitely because of the lack of local action, and this prevents the formation of sulfate. In fact, it is necessary to draw off the residual current at an almost impracticable rate to completely discharge the cell.

The complete wrapping of each electrode in a porous or pervious envelop of insulating material inert to the electrolyte prevents the active material both from swelling and from falling to the bottom of the cell, this latter contingency being further prevented by the supporting heads.

Experience has shown that the electrodes of the present invention are of lighter weight per volume, as well as higher capacity to the pound of weight than are the ordinary plate type of electrodes because of the greater amount of active material as compared with metallic lead, the lead oxid being lighter than metallic lead. In actual practice an electrode of the present invention is nearly one-third lighter than a plate electrode of the same capacity.

The various advantages of the present invention as enumerated have been proven out in actual practice and are due in part to the block form of the electrode, whereby the central metallic support is embedded in active material to such a depth in all directions that the depth of active material is greater than the penetrating effect of a discharge reducing the voltage to the discharge minimum. In the practical form each electrode is either actually triangular, as in Figs. 5, 6 and 7, or effectively so, as in Figs. 1 to 4 and Fig. 8, and in either case the approach toward the triangular form facilitates the assemblage of the electrodes into a geometric whole about a longitudinal center line, with a minimum cross sectional area, but still presenting a large active surface. Because of the effectively triangular form of the electrode the term trianguloid is employed in the claims to define either the triangular form of Figs. 5 to 7 or the sectoral forms of Figs. 1 to 4 and Fig. 8. Also, when the electrodes are assembled the adjacent faces of neighboring electrodes are out of parallelism with the remaining faces of such electrodes. The word trianguloid is also used as inclusive of a cross sectional shape of an electrode where the electrode tapers from an intermediate thick portion toward opposite edges, while the grid or support of metal is located at a central point about coincident with the midpoint of the trianguloid.

This application is a continuation in most part and in the broader aspects of the invention of our application No. 731,484, filed November 15, 1912, for method in the construction of lead accumulator electrodes.

What is claimed is:—

1. A storage battery electrode of block form with a central metallic support embedded in active material to a depth in all directions greater than the penetrating effect of a discharge reducing the voltage to the discharge minimum.

2. A storage battery electrode of block form consisting of a central metallic support and a surrounding mass of active material embedding the support, said electrode tapering in cross section from an intermediate thick portion toward opposite edges.

3. A storage battery electrode of substantially trianguloid form in cross section.

4. A storage battery electrode tapering in cross section from an intermediate thick portion toward opposite edges.

5. A storage battery electrode of block form consisting of a central metallic support with terminal heads outstanding from the support, and a mass of active material surrounding and embedding the support and outstanding therefrom to substantially the same extent as the heads.

6. A storage battery electrode of block form comprising a central core or grid with outstanding ends or heads and formed of metal to which the electrolyte employed is inert, and an embedding mass of active material completely surrounding the core or grid and lodged between the heads and in cross sectional extent substantially coextensive with the spread of the heads.

7. A storage battery electrode comprising a core or grid having terminal heads outstanding in all directions therefrom, a surrounding mass of active material completely embedding the core or grid and of a thickness corresponding to the lateral extent of the heads, and an insulating wrapping enveloping the active material and pervious to the electrolyte employed.

8. A storage battery comprising a plurality of electrodes of block form each representing a geometric section of a geometric solid and all the sections having the same relation to the longitudinal center line of the solid, each electrode being inclosed in an insulating wrapping and insulated from its neighbor and the assembled electrodes being tied together against displacement one relative to the other and independently of a container.

9. A storage battery comprising a plurality of electrodes each consisting of a central core and a surrounding mass of active material completely embedding the core, and the latter being provided at its lower end with a laterally extended head coextensive with and corresponding to the cross sectional area of the electrode, each electrode being provided with a wrapping of insulating material pervious to the electrolyte employed, and each electrode corresponding in shape to the others and in the form of a block constituting a regular section of a geometric solid defined by the assembled electrodes, and said electrodes being provided with binding means for holding them against relative displacement.

10. A storage battery comprising a plurality of block-like electrodes each inclosed in an insulating porous wrapping and said wrapped electrodes being assembled together in the form of a geometric solid with surrounding bands holding the assembled electrodes against relative displacement independently of a container.

11. A storage battery comprising a plurality of block-like electrodes assembled together in the form of a geometric solid with surrounding securing means holding the assembled electrodes against relative displacement, each electrode comprising a metallic core with laterally expanded terminal heads corresponding in shape and area to the cross sectional shape of the electrode, and a mass of active material completely embedding the core and extending to the margins of the heads and each electrode being provided with an envelop of an insulating material pervious to the electrolyte and of a strength to hold the active material against shedding.

12. A storage battery comprising a plurality of block-like electrodes assembled together in the form of a geometric solid with surrounding securing means holding the assembled electrodes against relative displacement, each electrode comprising a metallic core with laterally expanded terminal heads corresponding in shape and area to the cross sectional shape of the electrode, and a mass of active material completely embedding the core and extending to the margins of the heads and each electrode being provided with an envelop of an insulating material pervious to the electrolyte and of a strength to hold the active material against shedding, and each electrode being shaped to present an extended face toward the like face of the neighboring electrode with such adjacent faces out of parallelism with the remaining faces of the respective adjacent electrodes.

13. A storage battery comprising a plurality of electrodes each consisting of a metallic core having laterally expanded terminal heads and a mass of active material surrounding and embedding the core and extending to the margins of the heads, the electrode being of trianguloid form in cross section, and an envelop or wrapping for each electrode of relatively stiff insulating material pervious to the electrolyte employed and resistant to disintegration of the active material, and exterior bands surrounding the assembled electrodes and constructed to hold them against relative movement and in position to define a geometric solid.

14. A storage battery comprsing a plurality of electrodes each comprising a central core with a surrounding mass of active material embedding the core to a depth greater than the penetrating effect of a discharge reducing the voltage of the battery to the discharge minimum, each electrode being provided with an envelop or wrapping pervious to the electrolyte employed and of a relatively stiff material resistant to flaking off or shedding of the active material, and each electrode being in the form of a block defining a section of a geometric solid formed by the assembled electrodes, and means for holding the assembled electrodes in the form stated and against relative displacement.

In testimony that we claim the foregoing as our own we have hereto affixed our signatures in the presence of two witnesses.

GEORGE FULLER.
LEONARD FULLER.
GEORGE JOHN ANDREW FULLER.

Witnesses:
FRANK BLAKEY,
W. E. ROGERS.